(12) United States Patent
Yano et al.

(10) Patent No.: US 6,734,469 B2
(45) Date of Patent: May 11, 2004

(54) EL PHOSPHOR LAMINATE THIN FILM AND EL DEVICE

(75) Inventors: Yoshihiko Yano, Tokyo (JP); Tomoyuki Oike, Tokyo (JP); Yukihiko Shirakawa, Tokyo (JP); Katsuto Nagano, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/988,144

(22) Filed: Nov. 19, 2001

(65) Prior Publication Data

US 2002/0064682 A1 May 30, 2002

Related U.S. Application Data

(63) Continuation-in-part of application No. 09/866,691, filed on May 30, 2001.

(30) Foreign Application Priority Data

Nov. 17, 2000 (JP) ........................................ 2000-351861

(51) Int. Cl.[7] .............................................. H01L 33/00
(52) U.S. Cl. ................................. 257/103; 252/301.4 R
(58) Field of Search .................... 257/103; 252/301.4 R

(56) References Cited

U.S. PATENT DOCUMENTS

| 5,598,059 A | | 1/1997 | Sun et al. | |
|---|---|---|---|---|
| 5,780,966 A | | 7/1998 | Kato et al. | |
| 5,897,812 A | * | 4/1999 | Kitai et al. | ............ 252/301.4 R |
| 6,406,804 B1 | * | 6/2002 | Higashi et al. | ............. 428/690 |

FOREIGN PATENT DOCUMENTS

| EP | 0 720 418 | 7/1996 |
|---|---|---|
| EP | 0 740 490 | 10/1996 |
| JP | 61-250993 | 11/1986 |
| JP | 62-44989 | 2/1987 |
| JP | 8-134440 | 5/1996 |
| JP | 2840185 | 10/1998 |
| WO | WO 98/18721 | 5/1998 |

OTHER PUBLICATIONS

Noburu Miura, High Luminance Blue Emitting BaAl2S4: Eu Thin Film Electroluminescent Devices, Oct., 1999, Japanese Journal of Applied Physics, pp. 1–2.*

M. Kawanishi, et al., Technical Report of IEICE. EID98–113, pp. 19–24, "$CaAl_2S_4$:Ce Thin Films EL Devices Prepared By The Two Targets Pulse Electron–Beam Evaporation", Jan. 1999 (with partial English translation).

N. Miura, et al., Jpn. J. Appl. Phys., vol. 38, Part 2, No. 11B, pp. L1291–L1292, "High–Luminance Blue–Emitting $BaAl_2s_4$:Eu Thin–Film Electroluminescent Devices", 1999.

I. Tanaka, et al., The $22^{nd}$ Seminar Data Photoelectric Inter–Conversion the $125^{th}$ Commission EL Department, pp. 16–21, "Composition and Optical Properties of Blue–Emitting $BaAl_2S_4$:$Eu^{2+}$ Electroluminescent Thin Films", May 26, 2000. (With English concise explanation).

S. Oshio, et al., Display and Imaging, vol. 3, No. 2, pp. 181–187, "Novel Electroluminescent Thin Films: Thiogallate–Type Phosphors", 1994. (With English concise explanation).

(List continued on next page.)

Primary Examiner—George Eckert
Assistant Examiner—Joseph Nguyen
(74) Attorney, Agent, or Firm—Oblon, Spivak, McClelland, Maier & Neustadt, P.C.

(57) ABSTRACT

An object of the invention is to provide an EL phosphor laminate thin film and EL device which can emit light at a high luminance. The object is achieved by stacking a phosphor thin film and a dielectric thin film one on the other wherein the phosphor thin film comprises at least one compound selected from an alkaline earth thioaluminate, an alkaline earth thiogallate and an alkaline earth thioindate as a main component, and a rare earth element as a luminescence center, and the dielectric thin film comprises an alkaline earth-containing oxide and/or a titanium-containing oxide.

19 Claims, 5 Drawing Sheets

OTHER PUBLICATIONS

P. C. Donohue, et al., J. Electrochem. Soc., vol. 121, No. 1, pp. 137–141, "The Synthesis And Photoluminescence of $M^{II}M_2^{III}(S,Se)_4$,", Jan. 1974.

P. Benalloul, et al., Appl. Phys. Lett,., vol. 63, No. 14, pp. 1954–1956, "$IIA-III_2-S_4$ Ternary Compounds: New Host Matrices For Full Color Thin Film Electroluminescence Displays", Oct. 4, 1993.

K. T. Le Thi, et al., Materials Science and Engineering, B14, pp. 393–397, "Investigation of the $MA-Al_2S_3$ Systems (M=Ca, Sr, Ba) And Luminescence Properties of Europium–Doped Thioaluminates", 1992.

Patent Abstracts of Japan; vol. 1995, No. 8; Sep. 29, 1995 & JP 07 122364; May 12, 1995 abstract.

* cited by examiner

_US 6,734,469 B2_

EL PHOSPHOR LAMINATE THIN FILM AND EL DEVICE

This application is a Continuation-in-part application of U.S. application Ser. No. 09/866,691, filed on May 30, 2001, pending.

BACKGROUND OF THE INVENTION

1. Technical Field

The present invention relates to a phosphor substance used for EL (electroluminescence) devices, and more particularly to an EL phosphor laminate thin film and an EL device.

2. Background Art

In recent years, thin-film EL devices have been increasingly studied for compact or large yet lightweight flat display panels. A monochromatic thin-film EL display using a phosphor thin film comprising manganese-doped zinc sulfide for yellowish orange light emission has already been practically used in the form of a double-insulation structure using thin-film insulating layers 2 and 4 as shown in FIG. 2. Referring to FIG. 2, a lower electrode 5 is formed in a predetermined pattern on a glass plate serving as a substrate 1, and a first insulating layer 2 in the form of a dielectric thin film is formed on the lower electrode 5. On the first insulating layer 2, a light-emitting layer 3 and a second insulating layer (dielectric thin film) 4 are sequentially formed. An upper electrode 6 is formed on the second insulating layer 4 in such a predetermined pattern as to form a matrix with the lower electrode 5. Usually, the phosphor thin film has been annealed at a temperature lower than the strain point of the glass substrate for luminance improvements.

Recently, a structure using a ceramic substrate for the substrate 1 and a thick-film dielectric layer for the insulating layer 2 has also been put forward. Since this structure uses the ceramic material such as alumina as the substrate, it is possible to anneal the phosphor thin film at high temperature, thereby achieving luminance improvements. Since this structure uses the thick-film dielectric layer for the insulating layer, the structure also features the ability to provide a panel having high resistance to dielectric breakdown and high reliability as compared with EL devices using a thin film for the insulating layer.

To accommodate well to personal computer displays, TV displays and other displays, color displays are absolutely needed. Thin-film EL displays using sulfide phosphor thin films are satisfactory in reliability and environmental resistance, but are now considered unsuitable for color display purposes, because the properties of EL phosphors for emitting the three primary colors of red, green and blue are less than satisfactory. Candidates for the blue emitting phosphor are SrS:Ce where SrS is used as a matrix material and Ce as a luminescence center, $SrGa_2S_4$:Ce and ZnS:Tm, candidates for the red emitting phosphor are ZnS:Sm and CaS:Eu, and candidates for the green emitting phosphor are ZnS:Tb, CaS:Ce, etc., and studies thereof are now under way.

These phosphor thin films for emitting the three primary colors, viz., red, green and blue are poor in light emission luminance, efficiency and color purity, and so color EL panels are still on impractical levels. For blue in particular, a relatively high luminance is obtained using SrS:Ce. For the blue to be applied to full-color displays, however, its color purity is shifted to the green side. Thus, much improved blue emitting layers are in great demand.

To provide a solution to these problems, thiogallate or thioaluminate base blue phosphors having good luminance and color purity such as $SrGa_2S_4$:Ce, $CaGa_2S_4$:Ce and $BaAl_2S_4$:Eu are now under development, as set forth in JP-A 07-122364, JP-A 08-134440, Shingaku Giho EID98-113, pp. 19–24, and Jpll. J. Appl. Phys. Vol. 38 (1999), pp. L1291–1292.

The inventors, too, have made studies of thioaluminate base blue phosphors on the premise that blue EL materials of high luminance are essentially required for the development of full-color EL panels. However, the luminance achieved thus far is at most 100 cd/m² on 1 kHz driving and is still less than practical.

SUMMARY OF THE INVENTION

To provide a solution to the aforesaid problems, there is an increasing demand for a phosphor capable of emitting light at a high luminance, and especially a blue phosphor thin-film material. An object of the invention is to provide an EL phosphor laminate thin film capable of emitting light at a high luminance and an EL device.

This and other objects are achievable by any one of the following embodiments (1) to (11).

(1) An EL phosphor laminate thin film comprising a phosphor thin film and a dielectric thin film which are stacked one on the other, the phosphor thin film comprising a matrix material having the compositional formula:

wherein M is a metal element, A is at least one element selected from the group consisting of Mg, Ca, Sr, Ba and rare earth elements, B is at least one element selected from the group consisting of Al, Ga, In and rare earth elements, x is 1 to 5, y is 1 to 15, z is 3 to 30, and w is 3 to 30, and
   the dielectric thin film comprising an alkaline earth-containing oxide and/or a titanium-containing oxide.

(2) The EL phosphor laminate thin film of above (1), wherein the matrix material contains as a main component at least one compound selected from the group consisting of an alkaline earth thioaluminate, an alkaline earth thiogallate and an alkaline earth thioindate, and M is a rare earth element.

(3) The EL phosphor laminate thin film of above (1) or (2), wherein M is Eu element.

(4) The EL phosphor laminate thin film of above (2) or (3), wherein z and w are such numbers that z/(z+w) is 0.01 to 0.85.

(5) The EL phosphor laminate thin film of any one of above (1) to (4), wherein the matrix material is barium thioaluminate.

(6) The EL phosphor laminate thin film of any one of above (1) to (5), wherein the alkaline earth-containing oxide is a perovskite oxide.

(7) The EL phosphor laminate thin film of any one of above (1) to (6), wherein the alkaline earth-containing oxide is barium titanate.

(8) The EL phosphor laminate thin film of any one of above (1) to (7), wherein the dielectric thin film has a relative permittivity of at least 100.

(9) The EL phosphor laminate thin film of any one of above (1) to (8), wherein the dielectric thin film has a thickness of at least 100 nm.

(10) The EL phosphor laminate thin film of any one of above (1) to (9), wherein the dielectric thin film has been formed by a sputtering technique.

(11) An EL device comprising the EL phosphor laminate thin film of any one of above (1) to (10).

The present invention has been accomplished in the course of phosphor thin-film formation experiments made for the target to bring the luminance of a thioaluminate base blue phosphor substance up to a practical level. The EL phosphor laminate thin film thus obtained achieves an outstanding improvement in light emission luminance over conventional EL phosphor thin films.

DESCRIPTION OF THE PREFERRED EMBODIMENTS

Figure 1:
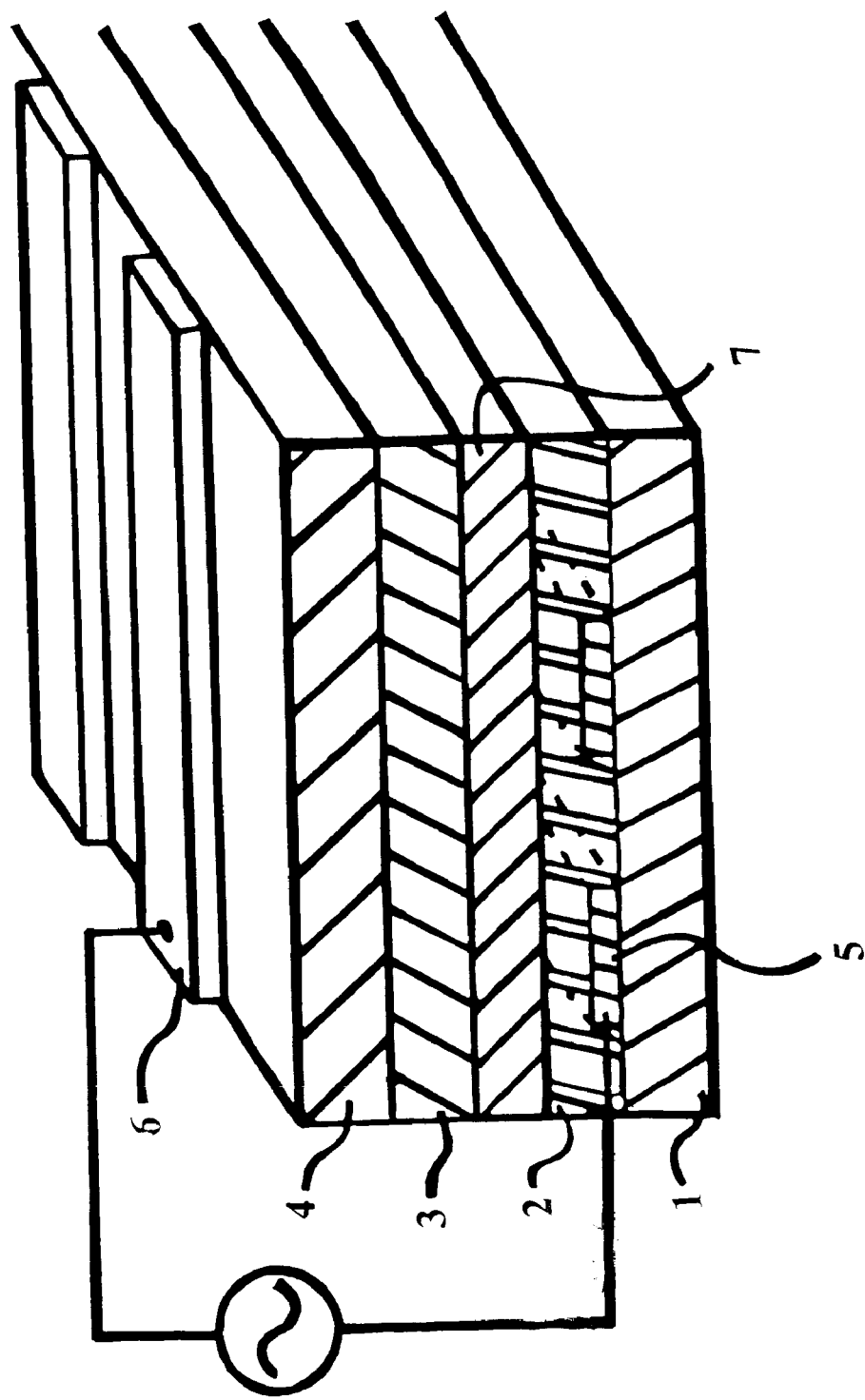
FIG. 1 is a sectional view in partly cut-away form illustrative of one exemplary structure of an EL device using the EL phosphor laminate thin film of the invention.
Figure 2:
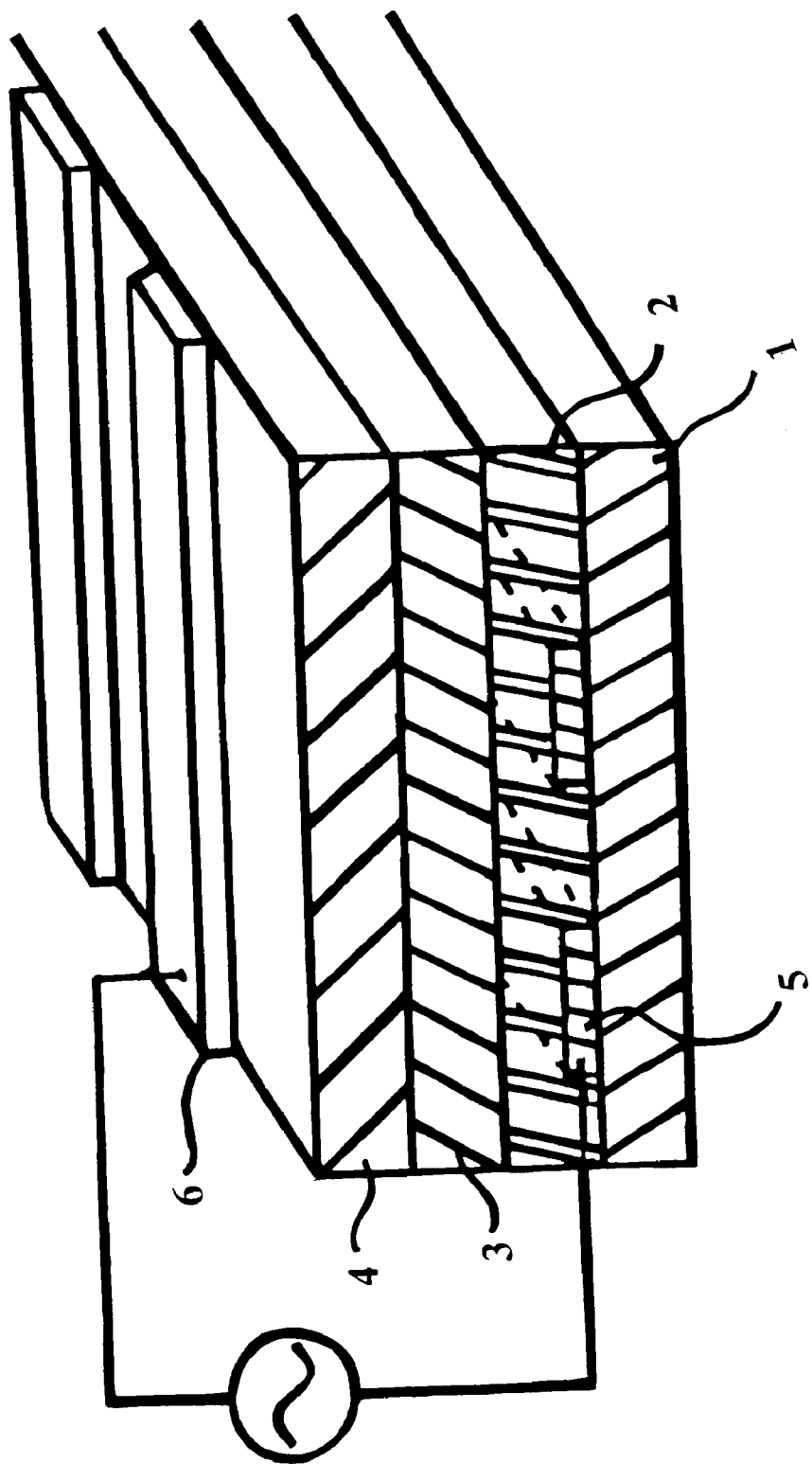
FIG. 2 is a sectional view in schematic form illustrative of a conventional double-insulating layer type EL device structure.

Several embodiments of the present invention are described below in detail.

The present invention provides an EL phosphor laminate thin film of the structure wherein a phosphor thin film and a dielectric thin film are stacked one on the other whereby luminance is improved.

There are still a lot of uncertainty about the light emitting mechanism of thioaluminate, thiogallate or thioindate base EL phosphor thin films.

An analysis of blue light-emitting $BaAl_2S_4$:Eu thin films is carried out in JSPS, the EL Subcommittee of the 125th Committee on Photoelectric Conversion, the 22nd Workshop paper, pp. 16–21. The paper reports that $BaAl_2S_4$ emits light in different areas in the thickness direction, with strong light emitted at an area near to the film surface, has a composition distribution in the thickness direction, and contains a large amount of oxygen. However, the mechanism of strong light emission has yet to be clarified.

The inventors have found that the emission of blue light stronger than ever before can be obtained by stacking a $BaAl_2S_4$:Eu thin film and a $BaTiO_3$ thin film one on the other.

Ternary compounds such as alkaline earth thioaluminates, alkaline earth thiogallates and alkaline earth thioindates have usually a higher crystallization temperature than do binary compounds such as ZnS and SrS, and so require a high-temperature process such as a film-formation process at 500° C. or higher, and a high-temperature annealing process at 800° C. or higher. It is believed that when the laminate film comprising a $BaAl_2S_4$:Eu thin film and a $BaTiO_3$ thin film is subjected to such high-temperature processes, the EL matrix material, luminescence center and EL thin-film structure are optimized under suitable conditions so that strong light emission is obtained.

When a laminate of a $BaAl_2S_4$:Eu thin film and an alkaline earth oxide and/or titanium oxide-containing dielectric thin film such as a $BaTiO_3$ thin film is subjected to the high-temperature process, Ba and oxygen are diffused into the portion of the $BaAl_2S_4$:Eu thin film near to the $BaTiO_3$ thin film, to thereby form a matrix material layer suitable for the light emission of the Eu luminescence center.

During the high-temperature process, Ba and S are diffused from the $BaAl_2S_4$:Eu thin film to the $BaTiO_3$ side to thereby form a matrix material layer suitable for the light emission of the Eu luminescence center.

An EL device emits light through the mechanism that electrons injected from an associated electrode collide with the luminescence center in the matrix material. The lamination of the $BaAl_2S_4$:Eu and $BaTiO_3$ thin films provides an interface suitable for electron injection, so that electrons can be effectively injected into the $BaAl_2S_4$:Eu thin film.

Since the $BaAl_2S_4$:Eu thin film is formed on an underlying structure of substrate/electrode/insulating film, elements can diffuse into, and react with, the underlying structure materials during formation and subsequent annealing of the $BaAl_2S_4$:Eu thin film. By interposing the alkaline earth oxide and/or titanium oxide-containing dielectric thin film such as the $BaTiO_3$ thin film between the underlying structure and the $BaAl_2S_4$:Eu thin film, any damage from the underlying structure is restrained. That is, the alkaline earth oxide and/or titanium oxide-containing dielectric thin film functions as a layer of inhibiting diffusion from the underlying layer. For instance, metal ions, especially Li, Na, Au and Pb ions are of high ion migration capability, and behave as movable ions in the light-emitting layer with a high electric field applied thereto, producing considerable influences on the light emission properties and, hence, significant influences on the light emission luminance and long-term reliability. Such undesired elements include Li, Pb and the like contained in glass used as the substrate, Li, Pb, Bi and the like contained as additives (e.g., sintering aids) in ceramic materials used as the substrate, and Pb and the like contained in lead-based dielectric materials used as the substrate, and so on.

The invention enables light emission at a high luminance by virtue of the interaction of these components.

Such a function is outstandingly accomplished by combining the aforementioned light emitting layer with an alkaline earth oxide-containing dielectric thin film while the diffusion inhibiting function is fully exerted even with a titanium oxide-containing dielectric thin film.

Alkaline earth sulfides are preferred for the phosphor thin film used herein. In particular, ternary compounds such as alkaline earth thioaluminates, alkaline earth thiogallates and alkaline earth thioindates are preferred to this end. Mixtures of Al, Ga and In are also useful. Of the ternary sulfur compounds, barium thioaluminate is especially preferred in the practice of the invention because of a high crystallization temperature. Most preferred is barium thioaluminate having Eu added thereto as a luminescence center, which is found to be effective for emitting blue light of high color purity at a high luminance.

The ternary compounds such as alkaline earth thioaluminates, alkaline earth thiogallates and alkaline earth thioindates, when represented by $A_xB_yS_z$, may take any form of $AB_2S_4$, $AB_4S_7$, $A_2B_2S_5$, $A_4B_2S_7$ and $A_5B_2S_8$.

Use may also be made of alkaline earth aluminates, alkaline earth gallates and alkaline earth indates obtained by replacing the S in the aforementioned sulfur compounds by O as well as oxysulfides intermediate between the oxides such as alkaline earth aluminate, alkaline earth gallate and alkaline earth indate and the sulfides such as alkaline earth thioaluminate, alkaline earth thiogallate and alkaline earth thioindate.

In particular, the barium thioaluminates used herein include $Ba_5Al_2S_8$, $Ba_4Al_2S_7$, $Ba_2Al_2S_5$, $BaAl_2S_4$, $BaAl_4S_7$, $Ba_4Al_{14}S_{25}$, $BaAl_8S_{13}$, $BaAl_{12}S_{19}$ and so on. For the matrix material, these compounds may be used alone or in admixture of two or more, and they may be in an amorphous state having no definite crystal structure.

The rare earth element added as the luminescence center is selected from the group consisting of at least Sc, Y, La, Ce, Pr, Nd, Gd, Tb, Ho, Er, Tm, Lu, Sm, Eu, Dy and Yb. Among these rare earth elements, it is preferable to use Eu for the blue phosphor; Ce, Tb, and Ho for the green phosphor; and Sm, Yb, and Nd for the red phosphor, when combined with the barium thioaluminate matrix material. In particular, Eu for the blue phosphor is most preferred. When combined with a strontium thiogallate matrix material, Eu is preferred for the green phosphor; and when combined with a strontium thioindate or barium thioindate matrix material, Sm, Yb, and Nd are preferred for the red phosphor. The amount of the rare earth element added should preferably be 0.5 to 10 at % based on the alkaline earth atoms.

The phosphor thin film of the invention should preferably have the compositional formula:

$$A_x B_y O_z S_w : M.$$

Herein M is a metal element, A is at least one element selected from the group consisting of Mg, Ca, Sr, Ba and rare earth elements, B is at least one element selected from the group consisting of Al, Ga, In and rare earth elements. Preferably, x is 1 to 5, y is 1 to 15, z is 0 to 30, and w is 3 to 40, most preferably z =3 to 30.

Most preferably, M is Eu because intense light emission is readily achievable. It is also preferred that z/(z+w) be from 0.01 to 0.85, and especially from 0.1 to 0.3 in order to produce EL devices with a high luminance and a long lifetime.

To obtain the phosphor thin film, for example, a reactive evaporation process to be described below is preferably employed. This process is now described while taking a barium thioaluminate:Eu phosphor thin film as an example.

A barium thioaluminate pellet with Eu added thereto is first prepared. Then, this pellet is subjected to electron beam (EB) evaporation in a vacuum chamber with $H_2S$ gas introduced therein. Here the $H_2S$ gas is used to make up for a deficiency of sulfur.

Besides, a multi-source reactive evaporation process is employable.

For instance, a binary reactive evaporation process using a barium sulfide pellet with Eu added thereto, an aluminum sulfide pellet, and $H_2S$ gas and similar processes are preferred.

The pressure during evaporation is preferably $1.33 \times 10^{-4}$ to $1.33 \times 10^{-1}$ Pa ($1 \times 10^{-6}$ to $1 \times 10^{-3}$ Torr). In particular, the amount of $H_2S$ gas introduced to compensate for sulfur may be adjusted to provide a pressure of $6.65 \times 10^{-3}$ to $6.65 \times 10^{-2}$ Pa ($5 \times 10^{-5}$ to $5 \times 10^{-4}$ Torr). Under a pressure beyond the range, the operation of the electron gun becomes unstable and compositional control becomes very difficult. The amount of $H_2S$ gas introduced is preferably 5 to 200 SCCM, especially 10 to 30 SCCM though it varies with the capacity of the vacuum system.

If required, the substrate may be moved or rotated during evaporation. The motion or rotation of the substrate allows the thin film to have a uniform composition and a reduced variation of thickness distribution.

When the substrate is rotated, the number of revolutions is preferably at least about 10 rpm, more preferably about 10 to 50 rpm, and especially about 10 to 30 rpm. If the rotational speed of the substrate is too high, there may often arise seal and other problems upon admission into the vacuum chamber. If the rotational speed of the substrate is too low, compositional gradation may occur in the thickness direction within the chamber so that the characteristics of the light emitting layer may become poor. The means for rotating the substrate may be any well-known rotating mechanism including a power source such as a motor or hydraulic rotational mechanism and a power transmission/gear mechanism having a combination of gears, belts, pulleys and the like.

Any desired heating means may be used for heating the evaporation sources or the substrate as long as it has the predetermined thermal capacity, reactivity or the like. For instance, tantalum wire heaters, sheathed heaters, and carbon heaters may be used. The temperature reached by the heating means is preferably in the range of about 100 to about 1,400° C., and the precision of temperature control is about ±1° C., preferably about ±0.5° C. at 1,000° C.

Europium is added to the source material in the form of a metal, fluoride, oxide or sulfide. Since the amount of Eu added varies with the source material and the thin film to be deposited, the composition of the source material is adjusted before an appropriate amount of Eu is determined.

During the evaporation process, the substrate may be maintained at a temperature of room temperature to 700° C., and preferably 400° C. to 550° C. Too low a substrate temperature may fail to take full advantage of the interaction between the phosphor thin film and the underlying dielectric thin film, and the crystallinity of the phosphor thin film may worsen. Too high a substrate temperature may cause a deterioration in the interface between the phosphor thin film and the underlying dielectric thin film or the phosphor thin film to have noticeable asperities on its surface and contain pinholes therein, giving rise to the problem of current leakage on EL devices. In addition, the thin film can be colored brown. For these reasons, the aforesaid temperature range is preferred. Furthermore, it is preferred to anneal the film after deposition. The annealing temperature is preferably 600° C. to 1,000° C., especially 750° C. to 900° C.

The phosphor thin film thus formed should preferably be highly crystalline. The crystallinity may be evaluated, for example, by X-ray diffraction. To enhance crystallinity, it is preferable to keep the substrate at as high a temperature as possible. It is also effective to anneal the thin film as deposited in vacuum, $N_2$, Ar, S vapor, $H_2S$ or the like.

While the thickness of the light-emitting layer is not critical, it is appreciated that too large a thickness results in an increased drive voltage whereas too small a thickness leads to a drop of light emission efficiency. Specifically, the light-emitting layer preferably has a thickness of about 100 to 2,000 nm, and especially about 150 to 700 nm, although the thickness varies with the identity of the fluorescent material.

According to the present invention, the phosphor thin film and the dielectric thin film comprising an alkaline earth-containing oxide and/or titanium-containing oxide, both described above, are stacked one on the other. A dielectric material using the same alkaline earth element as in the alkaline earth sulfide used as the main component of the phosphor thin film is preferred in controlling the interaction between the phosphor thin film and the dielectric thin film. Also, the function of a diffusion inhibiting layer is fully provided by a dielectric thin film comprising a titanium-containing oxide. The dielectric thin film comprising a titanium-containing oxide is advantageous from the standpoints of manufacturing process and cost in the application where light emitting characteristics are not required to be very good.

Dielectric materials containing ions harmful to the phosphor thin film are not preferred. Metal ions, especially Li, Na, Au and Pb ions are of high ion migration capability, and behave as movable ions in the light-emitting layer with a high electric field applied thereto, producing considerable influences on the light emission properties and, hence, significant influences on the light emission luminance and long-term reliability. The dielectric thin film used herein also plays the role of blocking harmful ions from migrating from the underlying structure to the phosphor thin film. Accordingly, the dielectric material used herein should have a reduced diffusion coefficient of harmful ions. The thicker the dielectric thin film, the higher becomes the blocking effect.

From the standpoint of diffusion inhibiting effect, the dielectric thin film should preferably have as large a thickness as possible. However, a dielectric thin film having a low relative permittivity is not preferable because an EL device fabricated using the same requires an increased EL drive voltage due to a drop of the effective voltage applied to the phosphor thin film. Accordingly, a dielectric material having a fairly high relative permittivity is preferred. Preferred alkaline earth oxides having a high relative permittivity are compound oxides.

For instance, the following materials, and mixtures of at least two of the following materials are preferred.

(A) Perovskite Material

Included are $CaTiO_3$, $SrTiO_3$, $BaTiO_3$, $BaZrO_3$, $CaZrO_3$ and $SrZrO_3$. Such simple perovskite oxides, and composite or layer perovskite oxides containing three or more metal elements, such as $(Ba,Sr)TiO_3$ are useful.

(B) Tungsten Bronze Material

Included are tungsten bronze oxides, e.g., SBN (strontium barium niobate), $SrNb_2O_6$ and $Ba_3Nb_{10}O_{28}$.

Most of these materials are ferroelectric materials having a phase transition point higher than room temperature and a relative permittivity of 100 or higher. These materials are described below.

Of the perovskite materials (A), $BaTiO_3$, strontium-based perovskite compounds, etc. are generally represented by the chemical formula: $ABO_3$ wherein A and B are each a cation. Preferably, A is at least one selected from Ca, Ba, Sr, La and Cd, and B is at least one selected from Ti, Zr, Ta and Nb.

Of the layer perovskite compounds, bismuth-based layer compounds are generally represented by the formula:

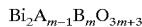

wherein m is an integer of 1 to 5, A is selected from among Bi, Ca, Sr, Ba, Pb, Na, K and rare earth elements (inclusive of Sc and Y), and B is Ti, Ta or Nb. Specific examples are $Bi_4Ti_3O_{12}$, $SrBi_2Ta_2O_9$, $SrBi_2Nb_2O_9$, etc. Any of these compounds or a solid solution thereof may be used in the practice of the invention.

Referring to the perovskite compounds, especially simple perovskite compounds, the ratio A/B in $ABO_3$ should preferably be from 0.8 to 1.3, and more preferably from 1.0 to 1.3. All perovskite compounds can crystallographically contain the aforesaid harmful ions such as lead ions at the A site. Reference is now made to a $BaTiO_3$ composition as a typical example. When the starting composition for the formation of a $BaTiO_3$ layer is such that the A site atom Ba is deficient relative to the B site atom Ti as represented by $Ba_{1-x}TiO_{3-x}$, the Ba-deficient site in the $BaTiO_3$ layer is easily replaced by the aforesaid harmful ion component such as lead ions, yielding a $(Ba_{1-x}Pb_x)TiO_3$ layer, for example. When the phosphor thin film is formed on the $BaTiO_3$ layer in such a state, no sufficient harmful ion-blocking effect is obtained because the phosphor thin film comes in direct contact with the lead component serving as harmful ions.

For this reason, the perovskite compound should desirably have a composition deviating from the stoichiometric composition to an A site excess side.

A ratio A/B in the above range ensures the insulating properties of the dielectric material and improves the crystallinity of the dielectric material and, hence, the dielectric properties thereof. However, no improvement in crystallinity is expectable at a ratio A/B less than 0.8, whereas a ratio A/B exceeding 1.3 makes it difficult to form a homogeneous thin film.

The desired A/B ratio is achievable by controlling the film-forming conditions. The ratio of O in $ABO_3$ is not limited to 3. Some perovskite compounds are found to have a stable structure in an excess or deficiency of oxygen; the value of x in $ABO_x$ is usually of the order of 2.7 to 3.3. It is noted that the A/B ratio may be determined by X-ray fluorescence analysis.

For the tungsten bronze materials (B), those set forth in "A Collection of Ferroelectric Materials", Landoit-Borenstein, Vol. 16 are preferred. The tungsten bronze material is generally represented by the chemical formula: $A_yB_5O_{15}$ wherein A and B are each a cation. Preferably, A is at least one element selected from Mg, Ca, Ba, Sr, rare earth elements and Cd, and B is at least one element selected from Ti, Zr, Ta, Nb, Mo, W, Fe and Ni.

The ratio O/B in these tungsten bronze compounds is not limited to 15/5. Some tungsten bronze materials are found to have a stable tungsten bronze structure in a deficiency or excess of oxygen; the ratio O/B is usually of the order of 2.6 to 3.4.

From the standpoint of diffusion inhibiting function, a dielectric thin film comprising a titanium-containing oxide is also useful. The dielectric thin film comprising a titanium-containing oxide may be used instead of or in combination with the aforesaid dielectric thin film.

The titanium-containing oxide is typically titania, that is, compounds represented by $TiO_x$ such as TiO, $TiO_2$ and $Ti_2O_3$, with $TiO_2$ being preferred.

The titanium-containing oxide reacts with diffusible cations, such as Ba, Sr, Pb or Bi cations to form $BaTiO_3$, $SrTiO_3$, etc. That is, the diffusion-inhibiting mechanism of the titanium-containing oxide layer essentially originates from its function of reacting with diffusible ions to absorb them rather than the barrier film function of inhibiting permeation of diffusible ions. Specifically, the $TiO_2$ film reacts with diffusible ions to form $TiO_2/BaTiO_3$ if the diffusible ion is Ba. Accordingly, the $TiO_2$ dielectric thin film may be intentionally formed as $TiO_2/BaTiO_3$ or the $TiO_2$ film be converted to $TiO_2/BaTiO_3$ through annealing treatment. In this case, the reaction product with diffusible ions is preferably a dielectric material having a high permittivity. In the case of titania, if the diffusible ion is Ba or Pb, then the reaction product is $BaTiO_3$ or $PbTiO_3$ which is a highly dielectric material as such. Then, even when the $TiO_2$ film is set to a relatively large thickness of 200 to 500 nm, the resulting film has a higher permittivity than the $TiO_2$ itself as mentioned above, eventually avoiding the inconvenience that an EL device fabricated using the same has an increased EL drive voltage.

The film having such a function is available with zirconia, hafnia and other rare earth oxides as well as titania. These oxides may be used instead of titania.

The dielectric thin film has a resistivity of $10^8$ Ω.cm or greater, and especially about $10^{10}$ to $10^{18}$ Ω. cm. From the standpoint of inhibiting the diffusion of lead or other harmful ions, the dielectric thin film should preferably have as large a thickness as possible. According to the inventors' empirical studies, the thickness should preferably be 200 nm or more, and more preferably 400 nm or more. A greater thickness is acceptable if it does not give rise to such a problem as a decline of effective relative permittivity. Most often, too greater a thickness brings about such a problem as cracks in the thin film.

The dielectric thin film usually has a relative permittivity of $\epsilon$=about 20 to 10,000, preferably $\epsilon$=about 100 to 10,000. Then the actual thickness is preferably from 100 nm to 5 $\mu$m, more preferably from more than 200 nm to 1 $\mu$m, and most preferably from 300 nm to 400 nm.

Even when the thickness of the dielectric thin film is 200 nm or less, the diffusion-inhibiting effect is achieved to some extent. However, the dielectric thin film is easily affected by minute surface defects or surface roughness of the underlying structure and a local surface roughness of the underlying structure due to the deposition of dust, etc. ascribable to the production process, with difficulty in achieving the diffusion-inhibiting effect to a full extent. This allows local diffusion of harmful ions, which can raise the problem that the phosphor thin film suffers a local luminance drop and deterioration.

No particular limitation is imposed on how to form the dielectric thin film. However, it is preferable to use processes by which films of 200 nm to 5 $\mu$m thick are easily obtained, for instance, sputtering, evaporation, sol-gel, and printing-and-firing processes. Especially when the sputtering process is used, an ability to form a film at a low temperature minimizes the diffusion of harmful ions from the underlying structure whereby a dielectric thin film having an improved diffusion-inhibiting function can be formed. Additionally, a dielectric film having high crystallinity and a high relative permittivity is readily obtainable. On account of these advantages, the sputtering process is preferred.

When an inorganic EL device is constructed using the EL phosphor laminate thin film of the present invention as a light-emitting layer 3, a structure as shown in FIG. 1 may be typically used. The structure includes a substrate 1, electrodes 5 and 6, a thick-film insulating layer 2, a thin-film insulating layer 4, and a dielectric thin film 7, while intermediate layers such as an adhesion enhancing layer, a stress mitigating layer and a reaction controlling layer may be interposed between the respective layers. The surface of the thick film may be improved in flatness as by polishing or providing a leveling layer.

In the EL phosphor laminate thin film of the invention, the number of lamina, the number of laminations, the order of lamination, and the positional relationship of phosphor thin films and dielectric thin films are arbitrary, and an intermediate layer may intervene between the phosphor thin film and the dielectric thin film. The preferred structure has the dielectric thin film between the substrate and the phosphor thin film.

FIG. 1 is a partly sectioned perspective view illustrating the structure of an EL device constructed using the inventive EL phosphor laminate thin film. In FIG. 1, a lower electrode 5 is formed in a predetermined pattern on a substrate 1, and a thick-film form of first insulating layer (thick-film dielectric layer) 2 is formed on the lower electrode 5. On the first insulating layer 2, a light-emitting layer 3 and a second insulating layer (thin-film dielectric layer) 4 are formed in this order, and an upper electrode 6 is formed on the second insulating layer 4 in a predetermined pattern so as to form a matrix with the lower electrode 5.

No particular limitation is imposed on the material used as the substrate as long as the material can withstand the layer formation temperature and annealing temperature encountered in fabricating EL devices, viz., it has a heat resistant temperature or melting point of 600° C. or higher, preferably 700° C. or higher, and more preferably 800° C. or higher, allows a functional thin film such as a light-emitting layer to be formed thereon to construct an EL device, and can maintain the desired strength. For instance, the substrate may be made of glass, ceramics such as alumina ($Al_2O_3$), forsterite ($2MgO.SiO_2$), steatite ($MgO.SiO_2$), mullite ($3Al_2O_3.2SiO_2$), beryllia (BeO), aluminum nitride (AlN), silicon nitride (SiN), and silicon carbide (SiC+BeO), and heat-resistant glass materials such as crystallized glass. Of these substrates, alumina substrates and crystallized glass substrates are especially preferred because their heat-resistant temperature is higher than about 1,000° C. Beryllia, aluminum nitride, and silicon carbide are preferred when thermal conductivity is necessary.

Besides, quartz and thermally oxidized silicon wafers may be used as well as metal substrates of titanium, stainless steel, Inconel and iron base materials. When electrically conductive substrates such as metal substrates are used, a structure in which a thick film having an electrode buried therein is formed on the substrate is preferred.

For the dielectric thick-film material (for the first insulating layer), known dielectric thick-film materials may be used. Such materials having a fairly high relative permittivity are preferred.

For instance, materials based on lead titanate, lead niobate, barium titanate, etc. may be used.

The dielectric thick film has a resistivity of $10^8$ $\Omega$.cm or greater, and especially about $10^{10}$ to $10^{18}$ $\Omega$.cm. Materials having a fairly high relative permittivity are preferred, and their relative permittivity $\epsilon$ is preferably of the order of 100 to 10,000. The dielectric thick film should preferably have a thickness of 5 to 50 $\mu$m, and more preferably 10 to 30 $\mu$m.

No particular limitation is imposed on how to form the insulating layer thick film. However, preference is given to a process by which a film of 10 to 50 $\mu$m thick can be easily obtained, e.g., a sol-gel process and a printing-and-firing process.

When the insulating layer thick film is formed by the printing-and-firing process, the starting material having a narrow distribution of particle size is mixed with a binder to prepare a paste having a suitable viscosity. The paste is applied onto a substrate by a screen printing technique, and dried to form a green sheet. The green sheet is fired at a suitable temperature, obtaining a thick film.

The thin-film insulating layer (the second insulating layer) may be formed, for instance, of silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate and PMN-PT base materials, which may take the form of a multilayer thin film or mixed thin film. To form the insulating layer from these materials, existing processes such as evaporation, sputtering, CVD, sol-gel and printing-and-firing processes may be used. In this case, the insulting layer should preferably have a thickness of about 50 to 1,000 nm, and especially about 100 to 500 nm.

The electrode (lower electrode) is formed at least on the substrate side or within the first dielectric material. For the electrode layer which is exposed to high temperature during thick-film formation or during heat treatment together with the light-emitting layer, any ordinary metal electrode may be used, which electrode comprises as a main component one or more of palladium, rhodium, iridium, rhenium, ruthenium, platinum, silver, tantalum, nickel, chromium, titanium and the like.

Since the EL device is usually designed in such a way that the emitted light is extracted out of its side facing away from the substrate, it is preferable to use for another electrode serving as the upper electrode a transparent electrode which is transmissive to light in the predetermined light emission wavelength range. If the substrate is transparent, then a transparent electrode can be used for the lower electrode because the emitted light can be taken out of the substrate side of the EL device. In this case, it is particularly preferable to use a transparent electrode of ZnO, ITO or the like. Usually, ITO contains $In_2O_3$ and SnO in stoichiometric composition, but the amount of O may deviate somewhat from the stoichiometry. The mixing ratio of $SnO_2$ with respect to $In_2O_3$ should be preferably 1 to 20% by weight, and more preferably 5 to 12% by weight. For IZO, the mixing ratio of ZnO with respect to $In_2O_3$ is usually of the order of 12 to 32% by weight.

The electrode may contain silicon. The silicon electrode layer may be either polycrystalline silicon (p-Si) or amorphous silicon (a-Si), and optionally, single crystal silicon.

The electrode comprising silicon as the main component is doped with an impurity for imparting electrical conductivity. Since the dopant used as the impurity is only required to provide the predetermined electrical conductivity, those dopants customarily used for silicon semiconductors may be employed to this end. For instance, B, P, As, Sb, Al and the like may be used; however, preference is given to B, P, As, Sb and Al. The concentration of the dopant is preferably of the order of 0.001 to 5 at %.

To form the electrode layer from these materials, existing processes such as evaporation, sputtering, CVD, sol-gel and printing-and-firing processes may be used. The same process as used to form the dielectric thick film is preferred particularly when it is desired to prepare a structure wherein a thick film having an electrode buried therein is formed on the substrate.

For the efficient application of an electric field to the light-emitting layer, the electrode layer should preferably have a resistivity of 1 $\Omega$.cm or lower, and especially 0.003 to 0.1 $\Omega$.cm. The electrode layer has a thickness of preferably about 50 to 2,000 nm, and especially about 100 to 1,000 nm although the thickness varies with the material of which the electrode layer is made.

EXAMPLE

The present invention is illustrated in further detail with reference to several examples.

Example 1

An EL device was fabricated using the EL phosphor laminate film of the present invention. The EL device had the same construction as explained with reference to FIG. 1.

A $BaTiO_3$—$PbTiO_3$ dielectric material having a relative permittivity of 2,000 was commonly used for both the substrate and the thick-film insulating layer, and a Pd electrode for the lower electrode. A sheet of substrate was prepared, and the lower electrode and thick-film insulating layer were screen printed on the substrate sheet to form a green sheet, which was co-fired. The sheet was polished on the surface, obtaining a substrate having a thick-film form of first insulating layer of 30 $\mu$m thick.

With this substrate serving as an underlying structure, a $BaTiO_3$ film was then formed thereon as a dielectric thin film by sputtering.

The $BaTiO_3$ film was formed using a magnetron sputtering system with a $BaTiO_3$ ceramic material as a target and under conditions: Ar gas pressure 4 Pa, radio frequency 13.56 MHz, and electrode density 2 W/cm$^2$. The film deposition rate was about 5 nm/min, and the sputtering time was adjusted so as to achieve a thickness of 400 nm. The resulting $BaTiO_3$ thin film was amorphous, and the heat treatment of this film at 700° C. gave a relative permittivity of 500. By X-ray diffraction, the heat-treated $BaTiO_3$ thin film was found to have a perovskite structure. This $BaTiO_3$ film was also found to have a composition containing an excess of 5% Ba over the stoichiometric composition.

Then, a barium thioaluminate phosphor thin film was formed on this dielectric thin film, using a multi-source evaporation process with two electron guns. An EB source charged with BaS powder with 5 at % of Eu added thereto and another EB source charged with $Al_2S_3$ powder were placed in a vacuum chamber, into which $H_2S$ was introduced. The feed materials were simultaneously evaporated from the respective EB sources to deposit a $BaAl_2O_3S$:Eu layer on a rotating substrate heated to 500° C. The rates of evaporation of the feed materials from the respective sources were controlled such that $BaAl_2O_3S$:Eu was deposited at a rate of 1 nm/sec. In the meantime, 20 SCCM of $H_2S$ gas were introduced. After the thin film had been formed, it was annealed in air at 700° C. for 20 minutes, obtaining a phosphor thin film of 300 nm thick.

An X-ray fluorescence analysis of the $BaAl_2O_3S$:Eu thin film formed on an Si substrate as a monitor showed an atomic ratio of Ba:Al:O:S:Eu=7.43:19.15:60.15:12.92:0.35.

Furthermore, a second insulating layer thin-film was formed on the phosphor thin film. For the second insulating layer thin-film, $Ta_2O_5$ was used to form a $Ta_2O_5$ film of 200 nm thick. On the second insulating thin-film layer, an ITO transparent electrode of 200 nm thick was formed by an RF magnetron sputtering process using an ITO oxide target and a substrate temperature of 250° C. The EL device was completed in this way.

Figure 3:
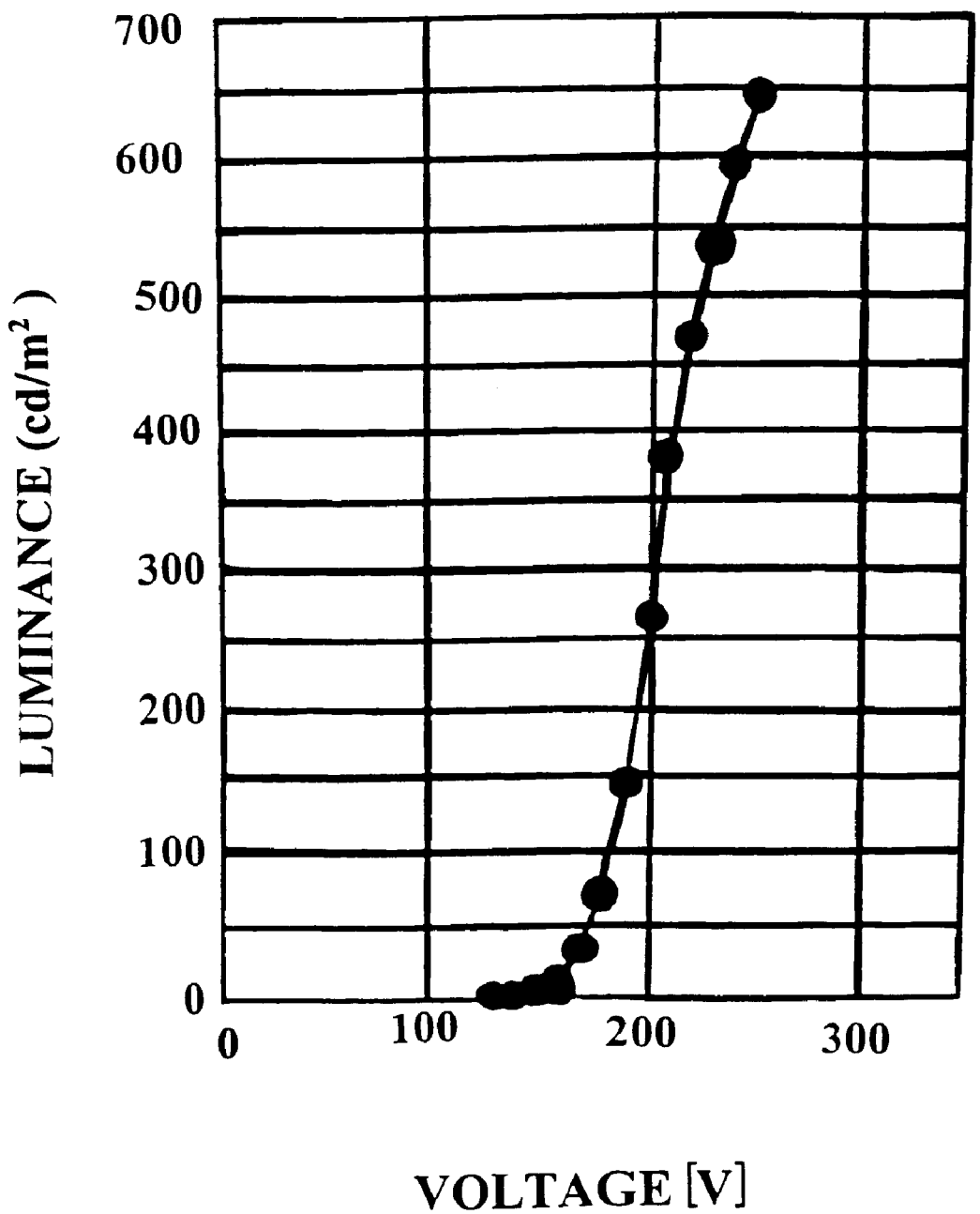
FIG. 3 is a graph showing the luminance vs. voltage of the EL phosphor laminate thin film deposited in Example 1.
Figure 4:
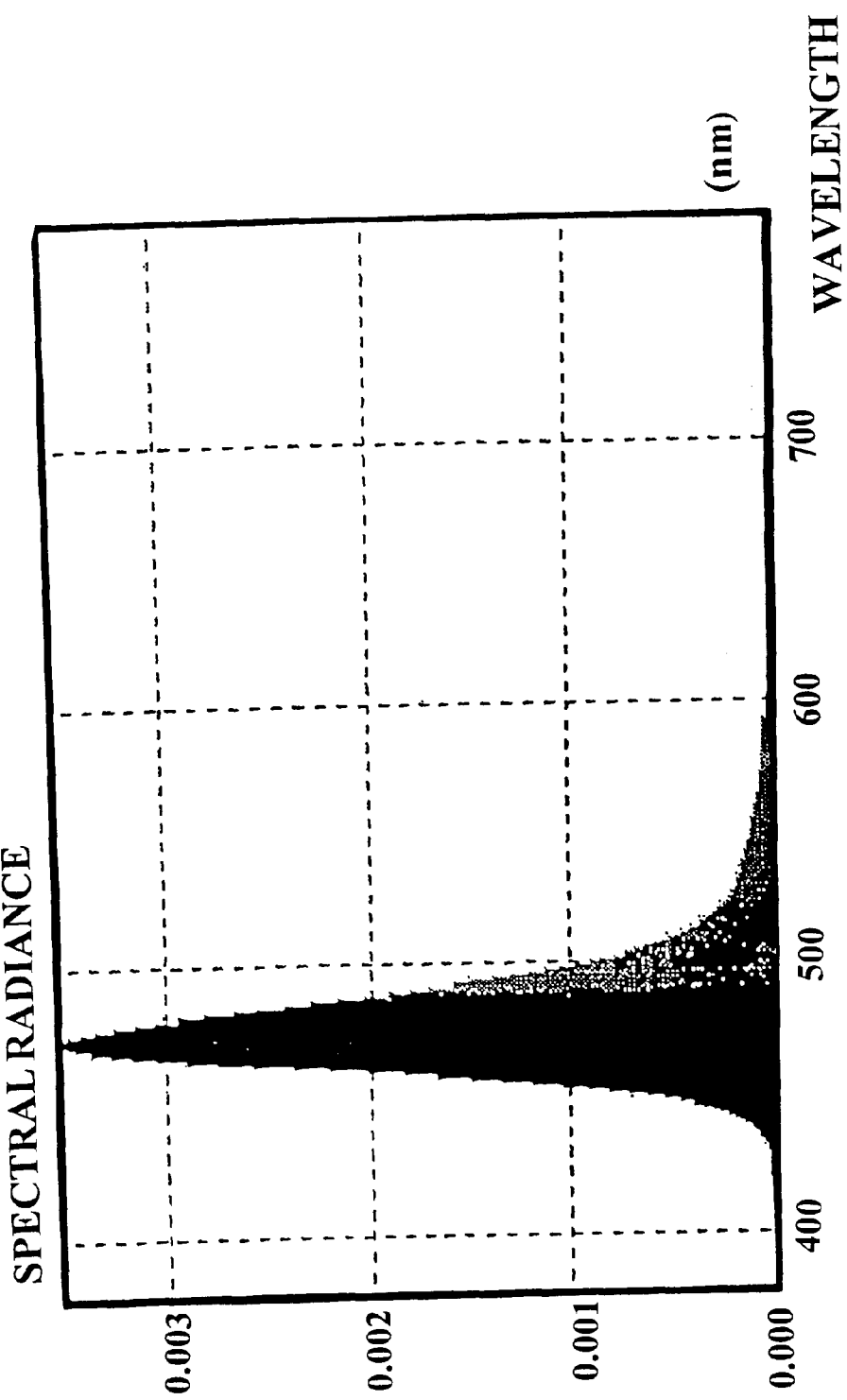
FIG. 4 is a graph showing the emission spectra of the EL device of Example 1.

The light emission properties of this EL device were evaluated. While electrodes were led out of the ITO upper electrode and the Pd upper electrode, a bipolar electric field of 40 $\mu$S in pulse width was applied at 1 kHz. The luminance vs. voltage characteristics are shown in FIG. 3. As can also be seen from FIG. 3, a light emission luminance of 650 cd/m$^2$ was obtained in a satisfactorily reproducible manner. An EL panel fabricated using this EL device emitted blue light having CIE 1931 chromaticity coordinates (0.1295, 0.1357), and the peak wavelength of emission spectra was 471 nm. The EL emission spectra are shown in FIG. 4.

Figure 5:
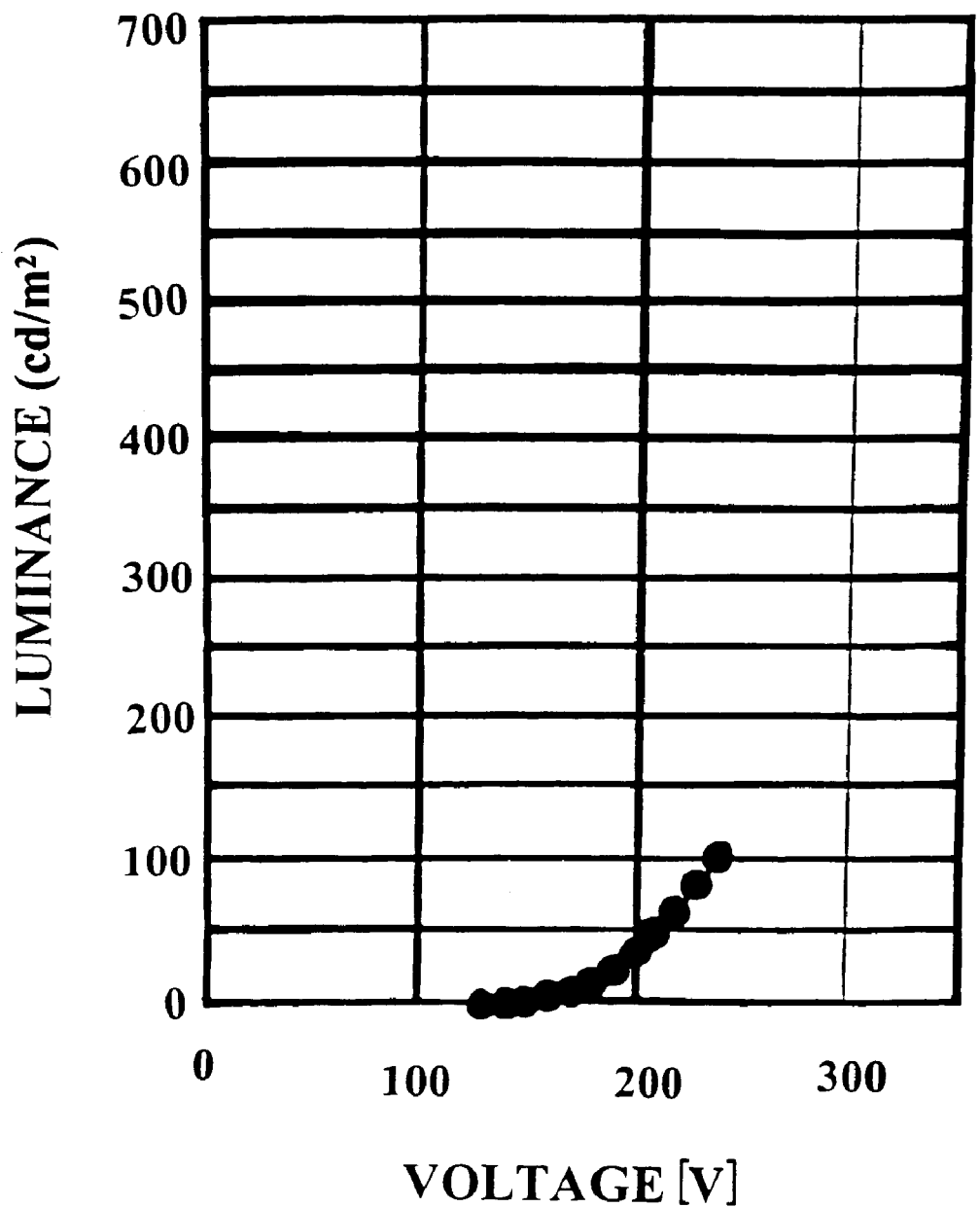
FIG. 5 is a graph showing the luminance vs. voltage of the comparative phosphor film sample deposited in Example 1.

As a comparative example, an EL device was prepared under much the same conditions as mentioned above with the exception that no $BaTiO_3$ dielectric thin film was used. As shown in FIG. 5, this EL device produced a luminance of 100 cd/m$^2$, which was less than $\frac{1}{6}$ of the luminance obtained in the inventive example. It is thus evident that the EL phosphor laminate thin film of the present invention affords a dramatically improved luminance.

Auger analysis was made on the samples of the inventive and comparative examples to determine the impurity content in a thickness direction. In the comparative example, Pb element was detected in the phosphor thin film area. This was presumably due to the diffusion of Pb element from the $BaTiO_3$—$PbTiO_3$ dielectric material used for the substrate and thick-film insulating layer. In the inventive example, no Pb element was detected in the phosphor thin film area, and an increased oxygen content was found on the phosphor side of the interface between the BaTiO$_3$ dielectric thin film and the phosphor thin film.

These results reveal that the luminance of the EL device is dramatically improved by the effects explained in conjunction with the advantages of the invention.

Example 2

An EL device was prepared as in Example 1 except that a strontium thiogallate phosphor thin film with Eu added thereto as a luminescence center was used as the phosphor thin film, and strontium titanate was used as dielectric thin film, respectively. Substantially equivalent results were obtained. In this example, green light was emitted.

Example 3

An EL device was prepared as in Example 1 except that a strontium thioindate phosphor thin film with Sm added thereto as a luminescence center was used as the phosphor thin film, and strontium titanate was used as dielectric thin film, respectively. Substantially equivalent results were obtained. In this example, red light was emitted.

Example 4

In Example 1, composite substrates were prepared by forming a series of BaTiO$_3$ films to a thickness of 0 nm, 100 nm, 200 nm, 300 nm, 400 nm, and 800 nm, as the dielectric thin film and annealing in air at 700° C.

On each of the composite substrates, a structure of Al$_2$O$_3$ film (50 nm)/ZnS film (200 nm)/barium thioaluminate phosphor thin film (300 nm)/ZnS film (200 nm)/Al$_2$O$_3$ film (50 nm) was formed instead of the single layer of barium thioaluminate phosphor thin film in Example 1 in order to acquire stable light emission of the EL device. It is understood that the Al$_2$O$_3$ film functions as a capping layer for controlling the amount of oxygen introduced into the phosphor thin film during annealing in an oxidizing atmosphere; and the ZnS film functions as a sulfur controlling layer for optimizing the sulfur content in the phosphor thin film during annealing when the phosphor thin film has previously been formed in excess or deficiency of sulfur. Once a device is fabricated, the Al$_2$O$_3$ film predominantly functions as a layer for injecting electrons to the light emitting layer rather than the functions of insulating film and dielectric layer; and the ZnS layer also functions as an injection augmenting layer for accelerating the injected electrons.

As previously described, the phosphor thin film was formed on a silicon substrate. An X-ray fluorescence analysis of this phosphor thin film, i.e., Ba$_x$Ga$_y$O$_z$S$_w$:Eu thin film showed an atomic ratio of Ba:Al:O:S:Eu= 5.88:18.89:11.50:48.75:0.35.

Furthermore, an ITO transparent electrode of 200 nm thick was formed on the resulting structure by an RF magnetron sputtering process using an ITO oxide target and a substrate temperature of 250° C. The EL devices were completed in this way.

An electric field of 50 μS in pulse width was applied at 1 kHz between the two electrodes of the EL devices, and their luminance was measured. The luminance was 1 cd/cm$^2$, 81 cd/cm$^2$, 105 cd/cm$^2$, 213 cd/cm$^2$ and 1400 cd/cm$^2$ when the BaTiO$_3$ film as the dielectric thin film had a thickness of 0 nm, 100 nm, 200 nm, 300 nm, and 400 nm, respectively. An EL device capable of light emission at a high luminance is obtained when the BaTiO$_3$ dielectric thin film has a thickness of approximately 400 nm.

Example 5

In Example 4, a Ba(Al$_{0.75}$Ga$_{0.25}$)$_2$S$_4$:Eu phosphor thin film with Eu added as the luminescence center was used as the phosphor thin film, and a barium strontium titanate film of 400 nm thick used as the dielectric thin film. Substantially equivalent results were obtained. In this example, green light was emitted. Evaluation of light emitting properties as in Example 4 revealed a high luminance of 1425 cd/cm$^2$.

Example 6

In Example 4, titania was used as the dielectric thin film. The results were substantially equivalent to those of the foregoing Examples. Specifically, TiO$_2$ was used as the titania and its thickness was 400 nm.

Evaluation of light emission as in Example 4 revealed a luminance of 900 cd/M$^2$. For comparison purposes, an EL device was fabricated under the same conditions as this device except that titania, BaTiO$_3$ or the like was not used as the dielectric thin film. It produced a luminance of about 1 cd/m$^2$. It is thus evident that the EL phosphor laminate thin film of the present invention affords a dramatically improved luminance.

Advantages of the Invention

The EL phosphor laminate thin film of the invention makes it possible to construct an EL device capable of light emission at a high luminance. The EL phosphor laminate thin film of the invention is applicable to other forms of devices, if possible. In particular, blue light is available at a luminance higher than ever before. The use of the blue light-emitting device leads to a full-color panel for display purposes.

What we claim is:

1. An EL phosphor laminate thin film comprising a phosphor thin film, a dielectric thin film, an insulating thin film, and an underlying structure, wherein the phosphor thin film is between the insulating thin film and the dielectric thin film, wherein the dielectric thin film is between the phosphor thin film and the underlying structure, wherein the underlying structure comprises at least one selected from the group consisting of Li, Na, Au and Pb, wherein the phosphor thin film comprises a matrix material having the compositional formula:

$A_xB_yO_zS_w$:M wherein M is a metal element, A is at least one element selected from the group consisting of Mg, Ca, Sr, Ba and rare earth elements, B is at least one element selected from the group consisting of Al, Ga, In and rare earth elements, x is 1 to 5, y is 1 to 15, z is 0 to 30, and w is 3 to 30, and wherein the dielectric thin film comprises an alkaline earth-containing oxide, a titanium-containing oxide or both.

2. The EL phosphor laminate thin film of claim 1, wherein the underlying structure comprises Pb.

3. The EL phosphor laminate thin film of claim 1, wherein the underlying structure comprises lead titanate, lead niobate, or both.

4. The EL phosphor laminate thin film of claim 1, wherein the underlying structure is at least one of a substrate, an electrode, or a thick-film dielectric layer.

5. The EL phosphor laminate thin film of claim 1, wherein the underlying structure is a thick-film dielectric layer.

6. The EL phosphor laminate thin film of claim 1, wherein the matrix material comprises at least one compound selected from the group consisting of an alkaline earth thioaluminate, an alkaline earth thiogallate and an alkaline earth thioindate, and M is a rare earth element.

7. The EL phosphor laminate thin film of claim 1, wherein M is Eu.

8. The EL phosphor laminate thin film of claim 1, wherein $z/(z+w)$ is from 0.01 to 0.85.

9. The EL phosphor laminate thin film of claim 1, wherein the matrix material comprises barium thioaluminate.

10. The EL phosphor laminate thin film of claim 1, wherein the dielectric thin film comprises a perovskite oxide.

11. The EL phosphor laminate thin film of claim 1, wherein the dielectric thin film comprises barium titanate.

12. The EL phosphor laminate thin film of claim 1, wherein the dielectric thin film has a relative permitivity of at least 100.

13. The EL phosphor laminate thin film of claim 1, wherein the dielectric thin film has a thickness of at least 100 nm.

14. The EL phosphor laminate thin film of claim 1, wherein the dielectric thin film is obtained by sputtering.

15. An EL device comprising the EL phosphor laminate thin film of claim 2.

16. The EL phosphor laminate thin film of claim 1, wherein the insulating thin film comprises at least one selected from the group consisting of $SiO_2$, SiN, $Ta_2O_5$, $SrTiO_2$, $Y_2O_3$, $BaTiO_3$, $ZrO_2$, SiON and $Al_2O_3$.

17. The EL phosphor laminate of claim 1, wherein the phosphor thin film is directly adjacent to the insulating film.

18. The EL phosphor laminate of claim 1, wherein the dielectric thin film is directly adjacent to the underlying structure.

19. The EL phosphor laminate of claim 1, wherein the phosphor thin film is directly adjacent to the insulating film and the dielectric thin film is directly adjacent to the underlying structure.

* * * * *